United States Patent
Nakasaka

(10) Patent No.: US 10,184,413 B2
(45) Date of Patent: Jan. 22, 2019

(54) CONTROL SYSTEM OF INTERNAL COMBUSTION ENGINE

(71) Applicant: TOYOTA JIDOSHA KABUSHIKI KAISHA, Toyota-shi, Aichi-ken (JP)

(72) Inventor: Yukihiro Nakasaka, Suntou-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 10 days.

(21) Appl. No.: 15/398,021

(22) Filed: Jan. 4, 2017

(65) Prior Publication Data
US 2017/0241361 A1 Aug. 24, 2017

(30) Foreign Application Priority Data
Feb. 24, 2016 (JP) ................................ 2016-032965

(51) Int. Cl.
*F02D 41/12* (2006.01)
*F02D 9/02* (2006.01)
(Continued)

(52) U.S. Cl.
CPC ............. *F02D 41/123* (2013.01); *F02D 9/02* (2013.01); *F02D 13/0234* (2013.01);
(Continued)

(58) Field of Classification Search
CPC .... F02D 41/123; F02D 41/126; F02D 41/182; F02D 41/401; F02D 41/34; F02D 41/32; F02D 9/02; F02D 13/0234; F02D 2041/001; F02D 2200/0406; F02M 35/1038; F02M 35/10386; Y02T 10/18; Y02T 10/44
See application file for complete search history.

(56) References Cited

U.S. PATENT DOCUMENTS 4,594,987 A * 6/1986 Wataya .................. F02D 41/182
123/494
4,785,786 A * 11/1988 Nagao ...................... F02D 33/00
123/472
(Continued)

FOREIGN PATENT DOCUMENTS

JP 61178536 A * 8/1986
JP 62-276237 12/1987
(Continued)

*Primary Examiner* — Joseph Dallo
(74) *Attorney, Agent, or Firm* — Finnegan, Henderson, Farabow, Garrett & Dunner, LLP

(57) ABSTRACT

A control system comprising a variable valve timing mechanism (B) able to set a closing timing of an intake valve (7), a fuel injector (13) for feeding fuel to a combustion chamber (5), an intake air amount detector (17) for detecting an amount of intake air fed to an intake passage from the outside air, and a pressure sensor (16) for detecting the pressure in the intake passage downstream of a throttle valve (16). When air in the combustion chamber (5) is blown back to the intake passage when injection of fuel is restarted after the fuel injection is stopped at the time of deceleration operation, the basis for calculation of the fuel injection amount in the initial cycle when fuel injection is restarted is switched from the amount of intake air detected by the intake air amount detector (17) to the pressure in the intake passage detected by the pressure sensor (18).

7 Claims, 16 Drawing Sheets

(51) Int. Cl.
*F02D 13/02* (2006.01)
*F02D 41/40* (2006.01)
*F02M 35/10* (2006.01)
*F02D 41/18* (2006.01)
*F02D 41/32* (2006.01)
*F02D 41/34* (2006.01)
*F02D 41/00* (2006.01)

(52) U.S. Cl.
CPC ......... *F02D 41/126* (2013.01); *F02D 41/182* (2013.01); *F02D 41/32* (2013.01); *F02D 41/34* (2013.01); *F02D 41/401* (2013.01); *F02M 35/1038* (2013.01); *F02M 35/10386* (2013.01); *F02D 2041/001* (2013.01); *F02D 2200/0406* (2013.01); *Y02T 10/18* (2013.01); *Y02T 10/44* (2013.01)

(56) References Cited

U.S. PATENT DOCUMENTS

| | | | |
|---|---|---|---|
| 2005/0087169 A1* | 4/2005 | Yoshida | F02D 41/065 123/299 |
| 2007/0144494 A1* | 6/2007 | Mori | F02D 41/0087 123/493 |
| 2008/0092834 A1* | 4/2008 | Stein | F01L 13/0036 123/90.15 |
| 2009/0187329 A1 | 7/2009 | Akihisa et al. | |
| 2014/0216394 A1* | 8/2014 | Matsuda | F02D 13/0223 123/295 |

FOREIGN PATENT DOCUMENTS

| | | |
|---|---|---|
| JP | 3-54257 | 5/1991 |
| JP | 2007-303423 | 11/2007 |
| JP | 2010116883 A * | 5/2010 |

\* cited by examiner

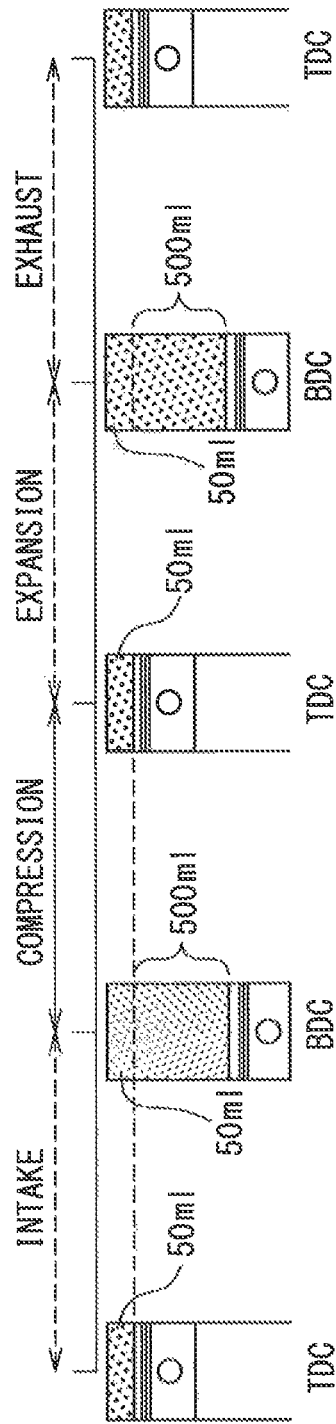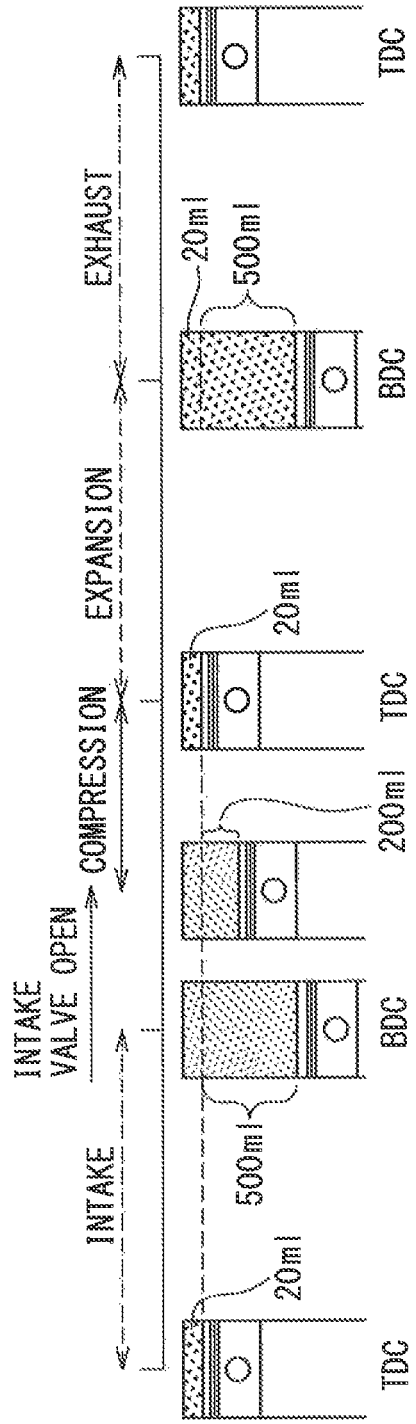

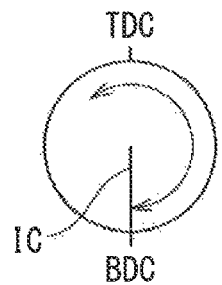 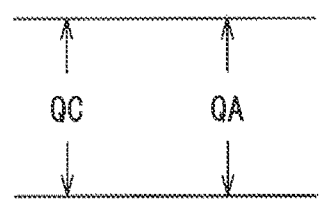
FIG. 11A
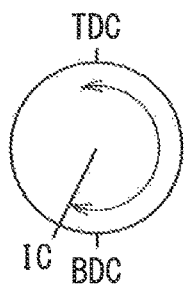 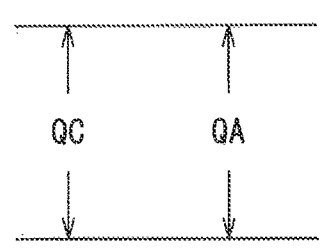
FIG. 11B
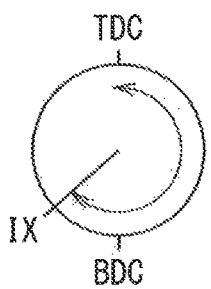 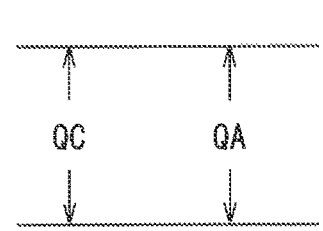
FIG. 11C
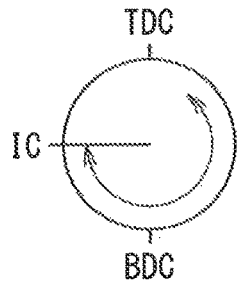 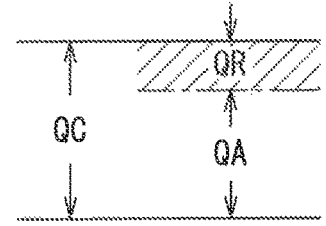
FIG. 11D
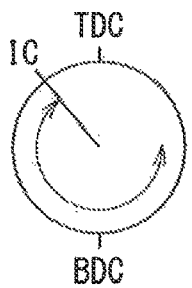 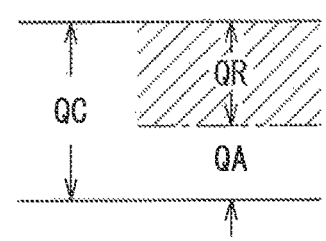
FIG. 11E FIG. 14A
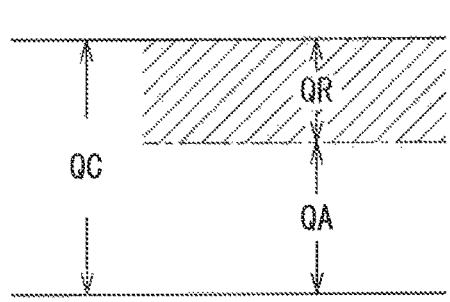
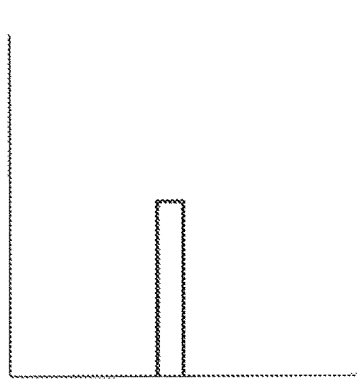
FIG. 14B
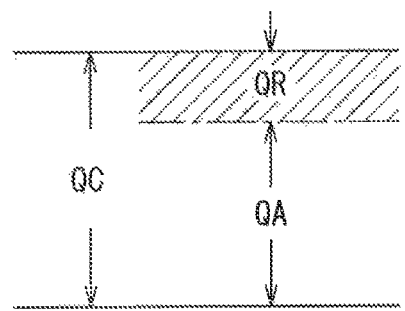
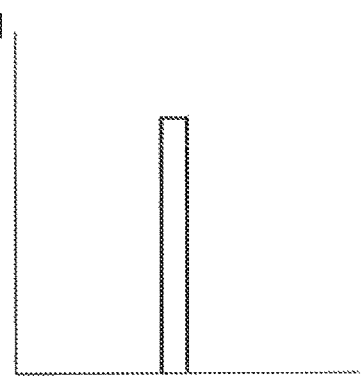

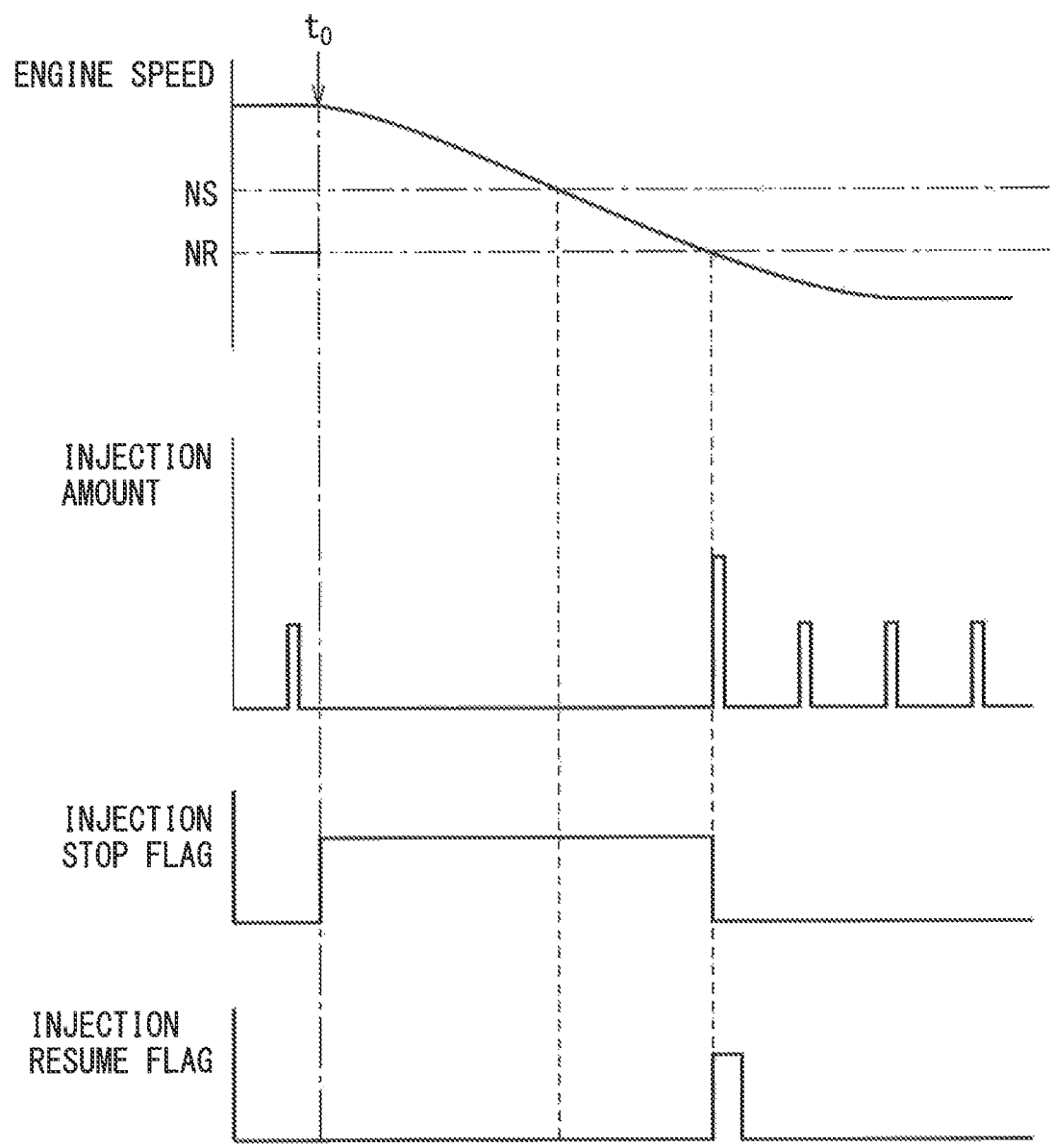

CONTROL SYSTEM OF INTERNAL COMBUSTION ENGINE

TECHNICAL FIELD

The present invention relates a control system of an internal combustion engine.

BACKGROUND ART

Known in the art is an internal combustion engine provided with a variable valve timing mechanism able to control the closing timing of an intake valve, a variable compression ratio mechanism able to change a mechanical compression ratio, an intake air amount detector for detecting the amount of intake air fed to the intake passage from the outside air, and a fuel injector for feeding fuel to the intake passage, wherein the fuel injection amount from the fuel injector is controlled so that the air-fuel ratio becomes the stoichiometric air-fuel ratio based on the amount of intake air detected by the intake air amount detector, the lower the engine load, the greater the mechanical compression ratio, and the closing timing of the intake valve becomes retarded from suction bottom dead center toward compression top dead center (for example, see Japanese Patent Publication No. 2007-303423A).

SUMMARY OF INVENTION

Technical Problem

If, like in this internal combustion engine, the closing timing of the intake valve is retarded from suction bottom dead center toward compression top dead center, when the piston rises after suction bottom dead center until the intake valve closes, the gas in the combustion chamber is blown back to the intake passage. This blown back gas is sent into the combustion chamber together with fresh gas at the time of the next suction stroke. In this regard if fuel injection from the fuel injector is temporarily stopped at the time of an engine deceleration operation in the state where the closing timing of the intake valve is retarded in this way, the gas in the combustion chamber is gradually replaced with fresh gas while the fuel injection is stopped. As a result, the air-fuel ratio of the gas blown back to the intake passage gradually becomes larger. Finally, the gas blown back in the intake passage becomes air. Therefore, after fuel injection stops, around when the fuel injection is restarted, this blown back air is sent to the combustion chamber together with the fresh gas at the time of the next suction stroke.

On the other hand, in this internal combustion engine, the fuel injection amount is controlled based on the amount of intake air detected by the intake air amount detector. Therefore, in this internal combustion engine, even if fuel injection is restarted, it may be considered to feed fuel from the fuel injector just for the intake air fed into the intake passage from the outside air, that is, the fresh gas in an amount of fuel required for making the air-fuel ratio of the fresh gas the stoichiometric air-fuel ratio. Therefore, at this time, fuel is not fed for the blown back air and the amount of fuel becomes insufficient by the amount of blown back air, so the air-fuel ratio of the air-fuel mixture in the combustion chamber becomes considerably lean. Therefore, the problem is liable to arise of good combustion not being able to be obtained when fuel injection is restarted.

Solution to Problem

According to the present invention, to prevent such a problem, there is provided a control system of an internal combustion engine comprising:
a variable valve timing mechanism able to set a closing timing of an intake valve between suction bottom dead center and compression top dead center,
a fuel injector for feeding fuel to a combustion chamber,
an intake air amount detector for detecting an amount of intake air fed to an intake passage from an outside air,
a throttle valve arranged in the intake passage,
a pressure sensor for detecting a pressure in the intake passage downstream of the throttle valve, and
an electronic control unit, wherein one cycle is comprised of a suction stroke, a compression stroke, an expansion stroke, and an exhaust stroke, and an amount of intake air detected by the intake air amount detector is used as a basis for calculation of a fuel injection amount to calculate a fuel injection amount from the fuel injector,
the electronic control unit being configured to temporarily stop an injection of fuel fed into the combustion chamber from the fuel injector at the time of an engine deceleration operation and restart the injection of fuel from the fuel injector after the fuel injection is stopped at the time of the engine deceleration operation and, further, the electronic control unit being configured to switch the basis for calculation of the fuel injection amount from the fuel injector in an initial cycle when the injection of fuel from the fuel injector is restarted, from the amount of intake air detected by the intake air amount detector to the pressure in the intake passage detected by the pressure sensor in case where an air in the combustion chamber is blown back to the intake passage when the injection of fuel from the fuel injector is restarted.

Advantageous Effects of Invention

At the time of restart of fuel injection after the engine deceleration operation, when an air in the combustion chamber is blown back to the intake passage, the total amount of air once fed into the combustion chamber becomes the sum of the amount of the air blown back to the intake passage and the amount of air remaining in the combustion chamber after closing the intake valve. In this case, if calculating the fuel injection amount based on the total amount of the air blown back to the intake passage and the air remaining in the combustion chamber after closing the intake valve, that is, the total amount of air fed once into the combustion chamber, it is possible to form an air-fuel mixture of the optimal air-fuel ratio in the combustion chamber at the time of restart of fuel injection. In this case, the total amount of air fed once to the combustion chamber can be calculated based on the pressure in the intake passage downstream of the throttle valve. Therefore, in the present invention, when an air in the combustion chamber is blown back to the intake passage when injection of fuel from the fuel injector is restarted, the basis for calculation of the fuel injection amount from the fact injector in the initial cycle when the injection of fuel from the fuel injector is restarted is switched from the amount of intake air detected by the intake air amount detector to the pressure in the intake passage detected by the pressure sensor and thereby an air-fuel mixture of the optimal air-fuel ratio can be formed in the combustion chamber.

BRIEF DESCRIPTION OF DRAWINGS

FIGS. 8A and BB are views for explaining a normal cycle and superhigh expansion ratio cycle.

FIGS. 11A to 11E are views showing the relationship between the closing timing of the intake valve and various types of amounts of gas QC, QA, and QR.

FIG. 14(A) and 14(B) are views for explaining an unpreferable example of control.

FIG. 15 is a view showing a change in each flag at the time of engine deceleration operation.

DESCRIPTION OF EMBODIMENTS

Figure 1:
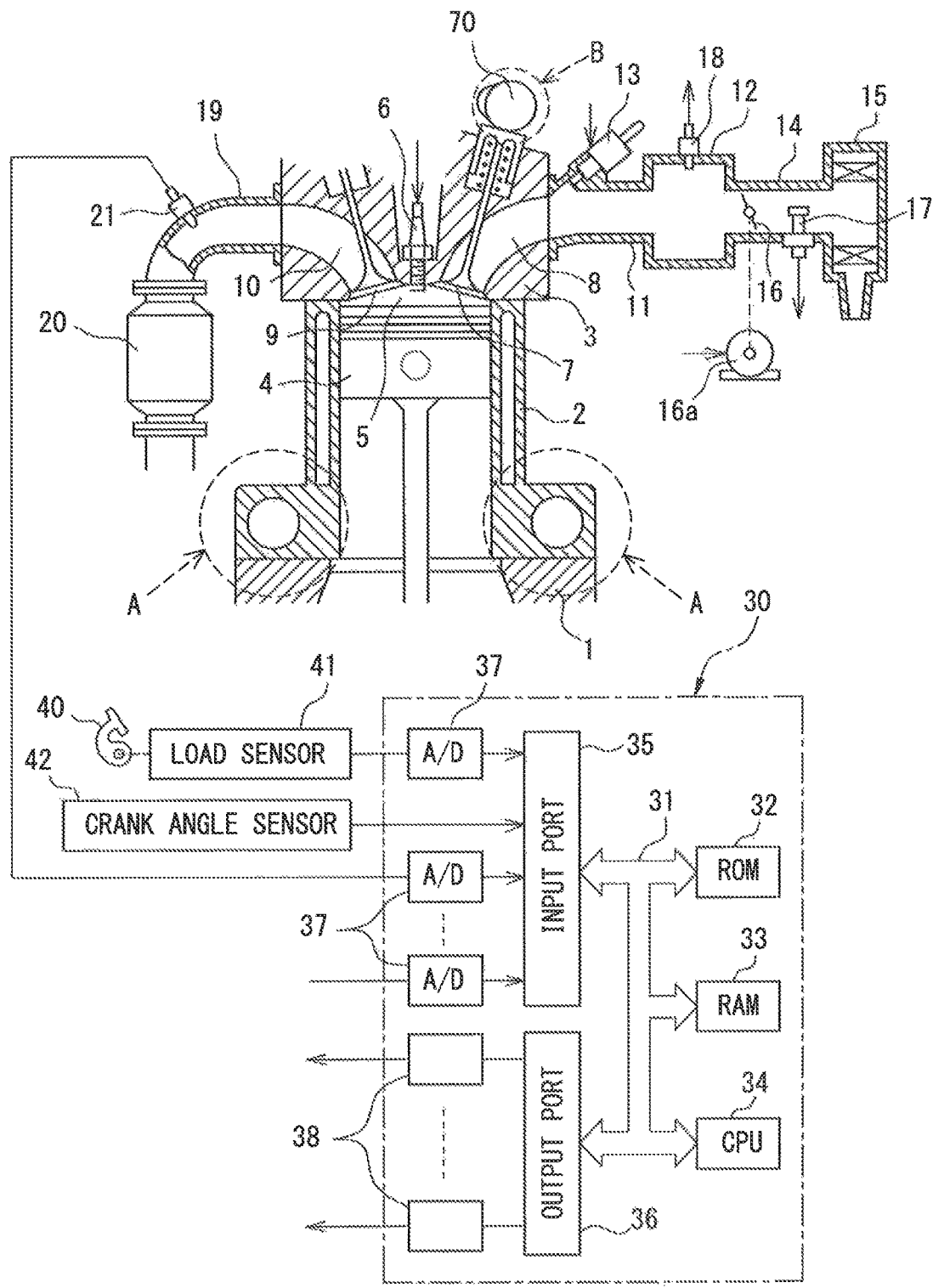
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided, with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 16 driven by en actuator 16a and an intake air amount detector 17 using for example a hot wire. In addition, a pressure sensor 18 for detecting the pressure in the surge tank 12, i.e., the pressure in an intake air passage downstream of the throttle valve 16 is arranged in the surge tank 12. On the other hand, the exhaust port 10 is connected through an exhaust manifold 19 to a catalytic converter 20 housing for example a three-way catalyst, while the exhaust manifold 19 is provided inside it with an air-fuel ratio sensor 21.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with a variable valve timing mechanism B able to control the closing timing of the intake valve 7.

The electronic control unit 30 is comprised of a digital computer provided with a ROM (read only memory) 32, RAM (random access memory) 33, CPU (microprocessor) 34, input port 35, and output port 36, which are connected with each other through a bidirectional bus 31. The output signals of the intake air amount detector 17, the pressure sensor 18 and the air-fuel ratio sensor 21 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through corresponding drive circuits 38 to the spark plug 6, fuel injector 13, throttle valve drive actuator 16a, variable compression ratio mechanism A, and variable valve timing mechanism B.

Figure 2:
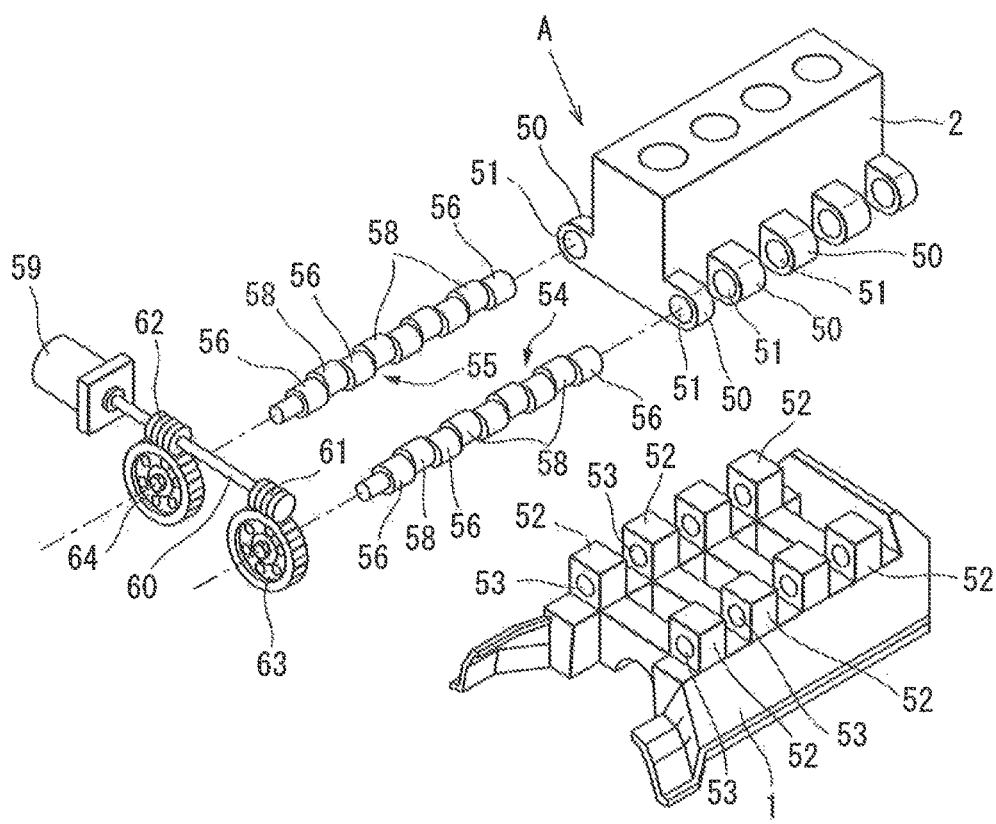
FIG. 2 is a disassembled perspective view of a variable compression ratio mechanism.
Figure 3A:
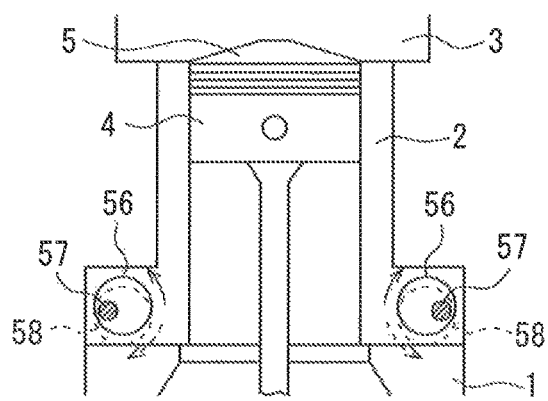
FIGS. 3A and 3B are side cross-sectional views of an internal combustion engine shown illustratively.
Figure 3B:
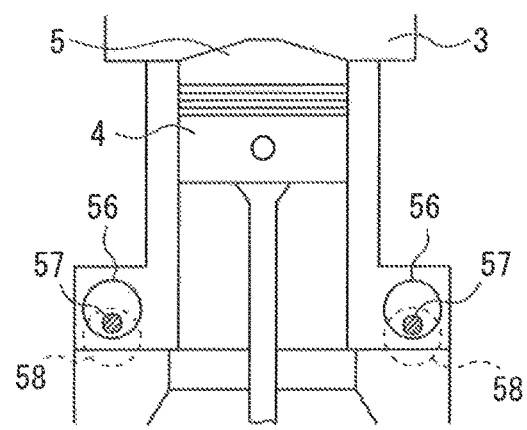

FIG. 2 is a disassembled perspective view of the variable compression ratio mechanism A shown in FIG. 1, while FIGS. 3A and 3B are side cross-sectional views of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 are provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIGS. 3A and 3B, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56, These circular cams 58 are rotatably inserted in the corresponding cam insertion holes 53.

When the circular cams 56 fastened to the cam shafts 54, 55 are rotated in opposite directions as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. As shown in FIG. 3B, when the eccentric shafts 57 move toward the bottom center, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned at the compression top dead center increases, therefore by making the cam shafts 54, 55 rotate, the volume of the combustion chamber 5 when the piston 4 is positioned at the compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 53 may be driven to change the volume of the combustion chamber 5 when the piston 4 is positioned at the compression top dead center over a broad range. Note that the variable compression ratio mechanism A shown from FIG. 1 to FIGS. 3A and 3B shows an example. Any type of variable compression ratio mechanism may be used.

Figure 4:
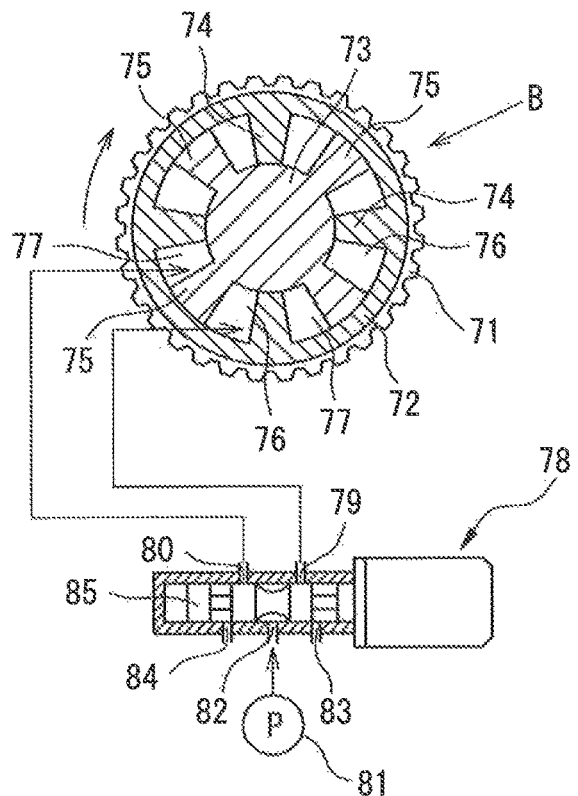
FIG. 4 is a view showing a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84 and a spool valve 85 for controlling connection and disconnection of the ports 79, 80, 82, 83, 84.

When the phase of the cams of the intake valve drive cam shaft 70 should be advanced, the spool valve 85 is made to move to the right in FIG. 4, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, when the phase of the cams of the intake valve drive cam shaft 70 should be retarded, the spool valve 85 is made to move to the left in FIG. 4, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
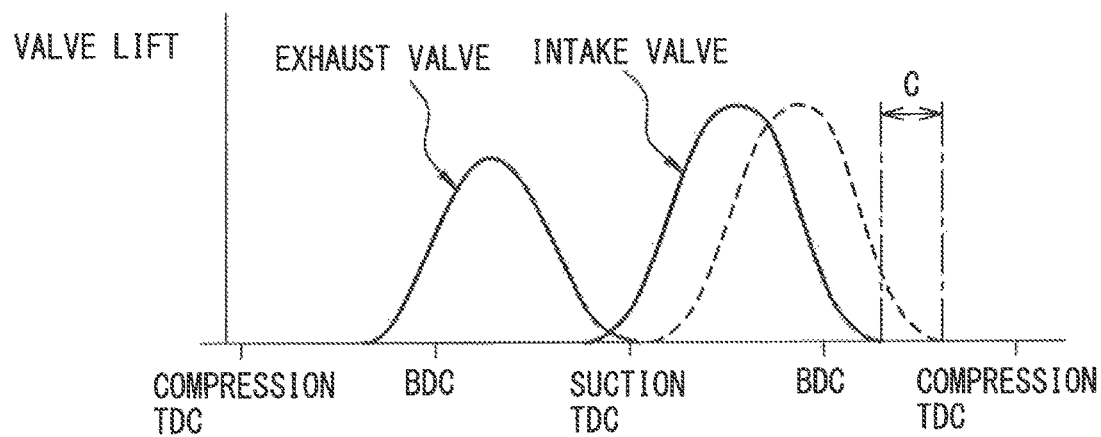
FIG. 5 is a view showing amounts of lift of the intake valve and exhaust valve.

In FIG. 5, the solid line shows when the variable valve timing mechanism 3 is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line and the range shown by the broken line in FIG. 5, therefore the closing timing of the intake valve 7 can be set to any crank angle in the range shown by the arrow C fn FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used.

Figure 6A:
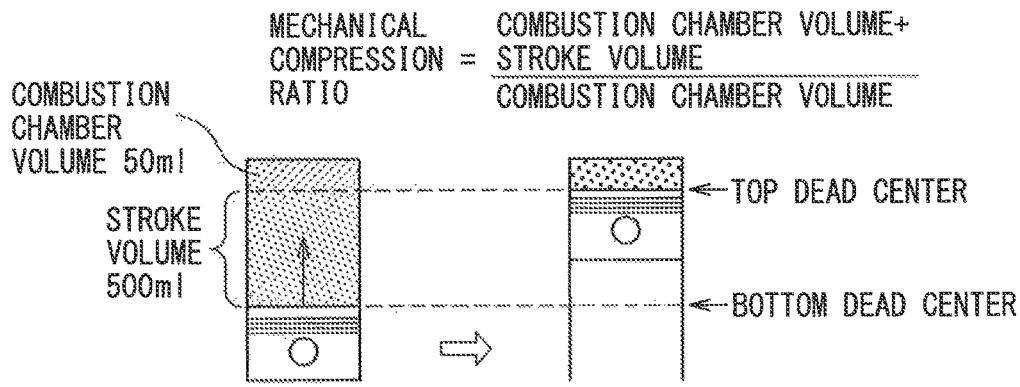
FIGS. 6A, 6B, and 6C are views for explaining the mechanical compression ratio, actual compression ratio, and expansion ratio.
Figure 6B:
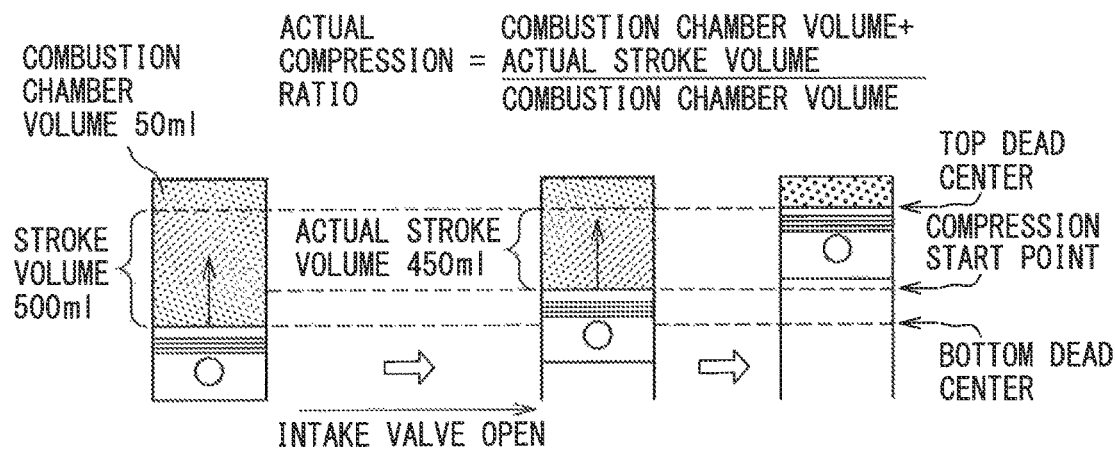
Figure 6C:
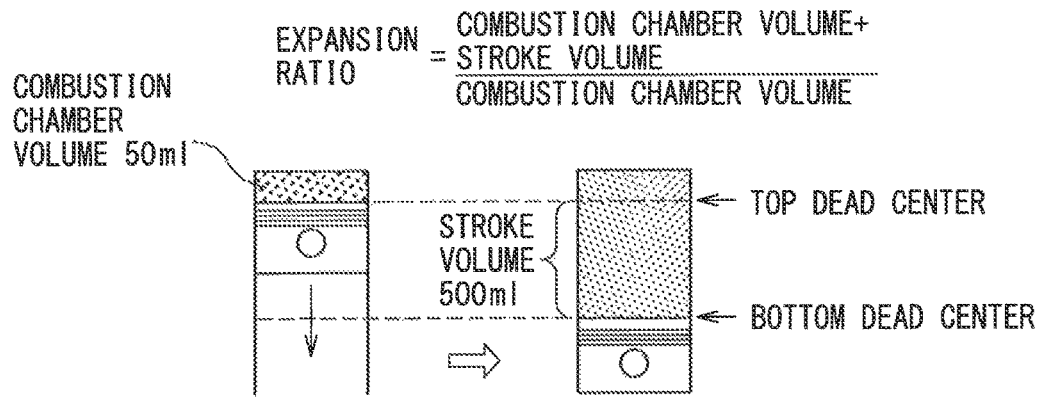

Next, the meaning of the terms used in the present application will be explained with reference to FIGS. 6A, 6B, and 6C. Note that FIGS. 6A, 6B, and 6C show for explanatory purposes an engine with a volume of the combustion chambers of 50 ml and a stroke volume of the piston of 500 ml. In these FIGS. 6A, 6B and 6C, the combustion chamber volume shows the volume of the combustion chamber when the piston is at the compression top dead center.

FIG. 6A explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual compression ratio. This actual compression ratio is a value determined from the actual stroke volume of the piston from when the compression action is actually started to when the piston reaches the top dead center and the combustion chamber volume. This actual compression ratio is expressed by (combustion chamber volume+actual stroke volume)/combustion chamber volume. That is, as shown in FIG. 6B even if the piston starts to rise in the compression stroke, no compression action is performed while the intake valve is opened. The actual compression action is started after the intake valve closes. Therefore, the actual compression ratio is expressed using the actual stroke volume as mentioned above. In the example shown in. FIG, 6B, the actual compression ratio becomes (50 ml+450 ml)/50 ml=10.

FIG. 6C explains the expansion ratio. The expansion ratio is a value determined from the stroke volume of the piston at the time of an expansion stroke and the combustion chamber volume. This expansion ratio is expressed by (combustion chamber volume+stroke volume)/combustion chamber volume. In the example shown in FIG. 6C, this expansion ratio becomes (50 ml+500 ml)/50 ml=11.

Next, a superhigh expansion ratio cycle used in the present invention will be explained with reference to FIG. 7 and FIGS. 8A and 8B. Note that FIG. 7 shows the relationship between the theoretical thermal efficiency and the expansion ratio, while FIGS. 8A and 8B show a comparison between the ordinary cycle and superhigh expansion ratio cycle used selectively in accordance with the load in the present invention.

FIG. 8A shows the ordinary cycle when the intake valve closes near the bottom dead center and the compression action by the piston is started from near substantially compression bottom dead center. In the example shown in this FIG. 8A as well, in the same way as the examples shown in FIGS. 6A, 6B, and 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
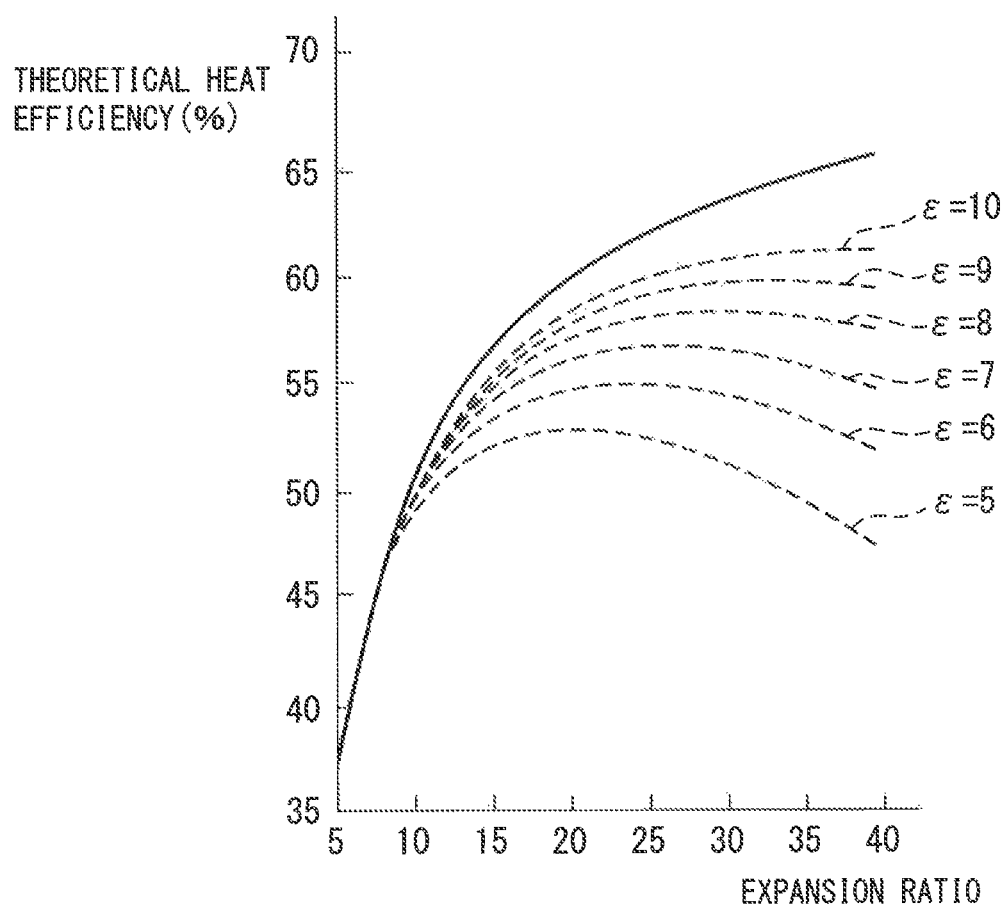
FIG. 7 is a view showing the relationship between the theoretical thermal efficiency and the expansion ratio.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line $\varepsilon=10$ in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. BB shows an example of the case when using the variable compression ratio mechanism A and variable valve timing mechanism B to maintain the actual compression ratio at a low value and raise the expansion ratio.

Referring to FIG. 8B, in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+ 200 ml)/20 ml=11 and the expansion ratio becomes (20 ml+500 ml)/20 ml=26. In the ordinary cycle shown in FIG. 8A, as explained above, the actual compression ratio is about 11 and the expansion ratio is 11. Compared with this case, in the case shown in FIG. 8B, it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is used, while at the time of engine high load operation, the ordinary cycle shown in FIG. 8A is used.

Next, the operational control as a whole will be explained, with reference to FIG. 9.

Figure 9:
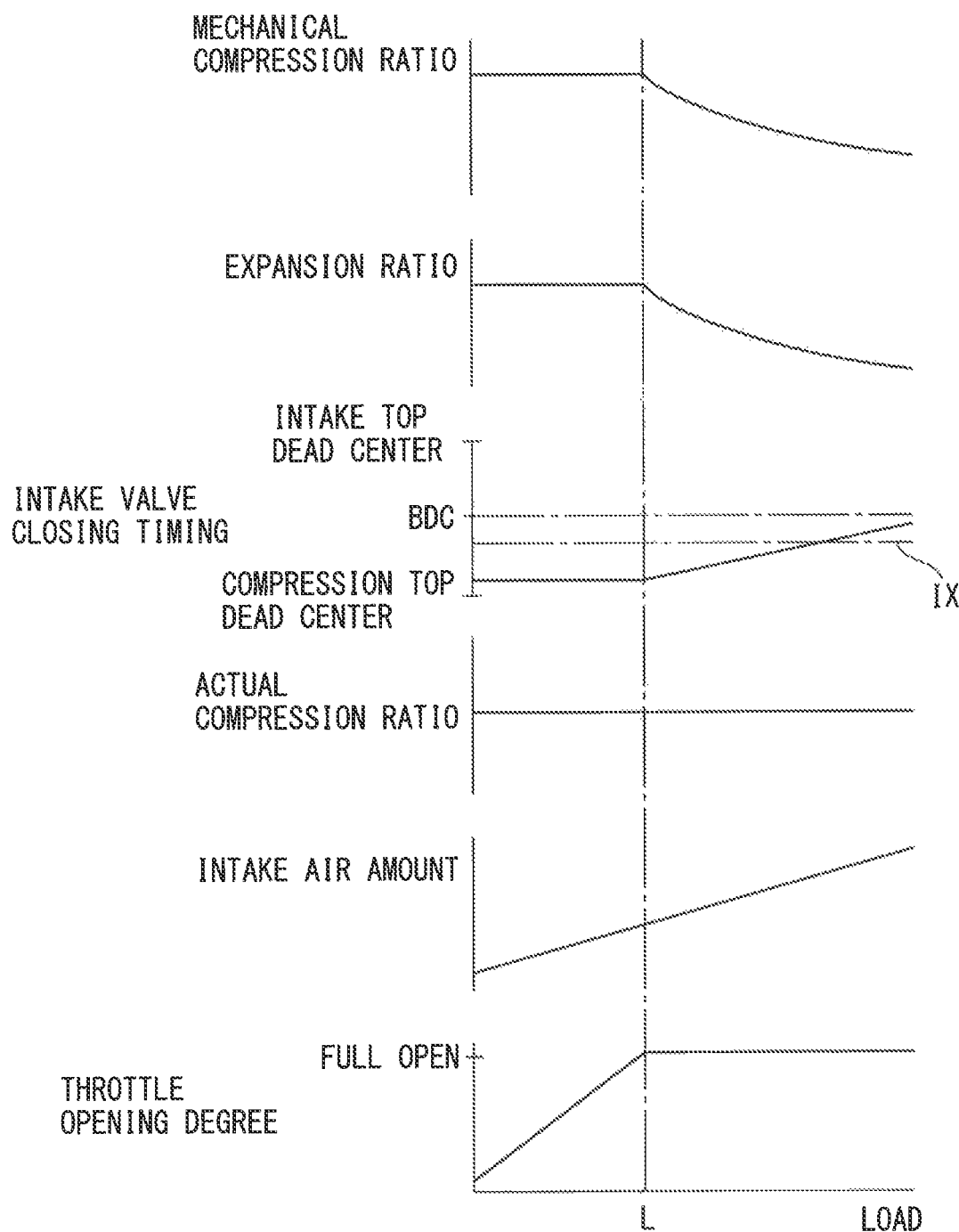
FIG. 9 is a view showing changes of the mechanical compression ratios etc. corresponding to the engine load.

FIG. 9 shows the changes in the mechanical compression ratio, expansion ratio, closing timing of the intake valve 7, actual compression ratio, the amount of intake air, and opening degree of the throttle valve 17 along with the engine load under a certain engine speed. In this case, in the embodiment according to the present invention, the air-fuel ratio in the combustion chamber 5 is feedback controlled to the stoichiometric air-fuel ratio. Note that in an example shown in FIG. 9, ordinarily the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unhurried HC, CO, and $NO_x$ in the exhaust gas.

Now, as explained above, at the time of engine high load operation, the ordinary cycle shown in FIG. 8A is executed. Therefore, at this time, since the mechanical compression ratio is made low as shown in FIG. 9, the expansion ratio becomes low, and the closing timing of the intake valve 7 is advanced as shown by the solid line in FIG. 5. Further, at this time, the amount of intake air is large, and the opening degree of the throttle valve 17 is maintained fully opened or substantially fully opened.

On the other hand, when the engine load becomes lower, the closing timing of the intake valve 7 is retarded so as to reduce the intake air amount along with that. Further, at that time, the mechanical compression ratio is increased as the engine load, becomes lower as shown in FIG. 9 so that the actual compression ratio is maintained substantially constant. Therefore, the expansion ratio is also increased as the engine load becomes lower. Note that at this time as well, the throttle valve 17 is held in the fully open or substantially fully open state. Therefore, the intake air amount fed into the combustion chamber 5 is controlled by changing the closing timing of the intake valve 7 without relying on the throttle valve 17.

In this way, when the engine load becomes lower from the engine high load operation state, the mechanical compression ratio is made to increase along with the reduction in the intake air amount under a substantially constant actual compression ratio. That is, the volume of the combustion chamber 5 when the piston 4 reaches the compression top dead center is reduced proportionally to the reduction in the intake air amount. Therefore, the volume of the combustion chamber 5 when the piston 4 reaches the compression top dead center changes in proportion to the intake air amount. Note that the air-fuel ratio in the combustion chamber 5 at this time becomes the stoichiometric air-fuel ratio, so the volume of the combustion chamber 5 when the piston 4 reaches the compression top dead center changes in proportion to the fuel amount.

If the engine load becomes further lower, the mechanical compression ratio is further made to increase. When the engine load falls to the medium load L closer to low load, the mechanical compression ratio reaches the limit mechanical compression ratio constituting the structural limit of the combustion chamber 5. If the mechanical compression ratio reaches the limit mechanical compression ratio, in the region of a load lower than the engine load L where the mechanical compression ratio reaches the limit mechanical compression ratio, the mechanical compression ratio is held at the limit mechanical compression ratio. Therefore, at the time of low load side engine medium load operation and at the time of engine low load operation, i.e., at the engine low load operation side, the mechanical compression ratio becomes maximum and the expansion ratio also becomes maximum. In other words, at the engine low load operation side, the mechanical compression ratio is made maximum so that the maximum expansion ratio is obtained.

Figure 10A:
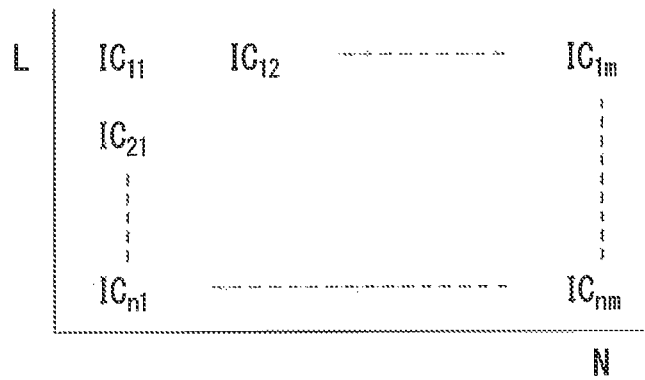
FIGS. 10A, 10B, and 10C are views showing maps of the closing timing of an intake valve, etc.
Figure 10B:
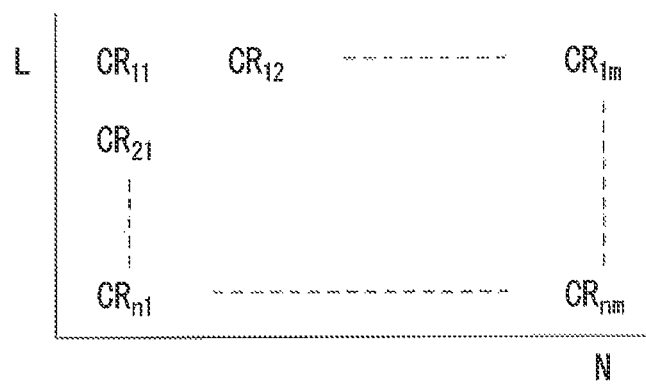
Figure 10C:
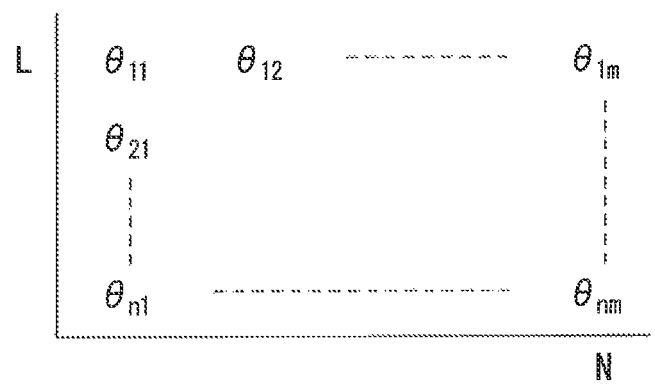

On the other hand, in the embodiment shown in FIG. 3, when the engine load becomes less than L, the closing timing of the intake valve 7 is maintained at the most retarded timing. Further, in the embodiment shown in FIG. 9, when the engine load is more than L, that is, at the engine high load operation side, the throttle valve 17 is held in the fully open state, but when the engine load is less than L, that is, when at the engine low load operation side, the throttle valve 17 is closed as the engine load decreases. Note that, the closing timing of the intake valve 7 shown in FIG. 9 is stored as a function of the engine load L and engine speed N in the form of the map as shown in FIG. 10A in advance in the ROM 32, and the mechanical compression ratio CR shown in FIG. 9 is stored as a function of the engine load L and engine speed N in the form of the map as shown in FIG. 10B in advance in the ROM 32. In addition, the opening degree θ of the throttle valve 16 shown in FIG. 9 is also stored as a function of the engine load L and engine speed N in the form of the map as shown in FIG. 10C in advance in the ROM 32.

Next, referring to FIGS. 11A to 11E, the relationship among the closing timing IC of the intake valve 7, the amount of gas QC fed into the combustion chamber 5, the amount of gas QA remaining in the combustion chamber 5, and the amount of gas QR blown back from the combustion chamber 5 to the intake passage will be explained. Note that, these gases usually contain fuel. If referring to FIGS. 11A to 11B, FIG. 11A shows the case where the closing timing IC of the intake valve 7 is set to suction bottom dead center BDC. In this case, the gas fed into the combustion chamber 5 remains as is in the combustion chamber 5 without being blown back to the intake passage, so the amount of gas QC fed into the combustion chamber 5 becomes equal to the amount of gas QA remaining in the combustion chamber 5.

FIG. 11B shows the case where the closing timing IC of the intake valve 7 is retarded somewhat from suction bottom dead center BDC and the closing timing IC of the intake valve 7 is set to a closing timing where the action of intake inertia pushing fresh gas into the combustion chamber 5 is the strongest. In this case as well, the gas fed into the combustion chamber 5 remains inside the combustion chamber 5 as it is without being blown back to the inside of the intake passage, so, in this case as well, the amount of gas QC fed into the combustion chamber 5 becomes equal to the amount of gas QA remaining in the combustion chamber 5. Note that, as will be understood from a comparison with FIG. 11A, in the case shown in FIG. 11B, the action of intake inertia pushing fresh gas into the combustion chamber 5 causes the amount of gas QC remaining in the combustion chamber 5 to increase.

FIG. 11D shows the case where the closing timing IC of the intake valve 7 is set to a closing timing at a considerably retarded side. In this case, in the period after suction bottom dead center BDC to when the intake valve 7 closes, the gas in the combustion chamber 5 is blown back to the intake passage along with the rise of the piston 4. The amount of gas remaining in the combustion chamber 5 is decreased by this amount of blown back gas. That is, at this time, the gas fed to the combustion chamber 5 may be divided into gas blown back to the intake passage and the gas remaining in the combustion chamber 5 after the intake valve 7 closes. FIG. 11D shows the amount of gas QC fed into the combustion chamber 5 at this time, the amount of gas QR blown back to the intake passage, and the amount of gas QA remaining in the combustion chamber 5 after the intake valve 7 closes. The gas remaining in the combustion chamber 5 after the intake valve 7 closes is ejected from the combustion chamber 5 in the exhaust stroke after combustion, and then fresh gas corresponding to this amount of gas QA is fed into the combustion chamber 5 during the next suction stroke, so this amount of gas QA expresses the amount of fresh gas. That is, in FIG. 11D, QR expresses the amount of gas blown back to the intake passage, while QA expresses the amount of fresh gas.

On the other hand, FIG. 11E shows the case where the closing timing IC of the intake valve 7 is further retarded from suction bottom dead center BDC toward compression top dead center TDC. In this case, the amount of gas QR blown back to the intake passage further increases, so the amount of gas QA remaining in the combustion chamber 5 after the intake valve 7 closes, that is, the amount of fresh gas QA, decreases.

On the other hand, if further retarding the closing timing IC of the intake valve 7 compared with the case shown in FIG. 11B, the action of intake inertia pushing fresh gas into the combustion chamber 5 is weakened, the amount of gas QC remaining in the combustion chamber 5 is decreased, and the gas in the combustion chamber 5 starts to be blown back to the intake passage. FIG. 11C shows where the closing timing IC of the intake valve is set to a closing timing where the amount of gas QC remaining in the combustion chamber 5 is decreased and gas in the combustion chamber 5 starts to be blown back to the intake passage. In an embodiment according to the present invention, the closing timing IC where the amount of gas QC remaining in the combustion chamber 5 in this way decreases and the gas in the combustion chamber 5 starts to be blown back to the intake passage will be called the "boundary closing timing IX". Therefore, in an embodiment according to the present invention, when the closing timing IC of the intake valve 7 is at the retarded side from the boundary closing timing IX, gas is blown back from the combustion chamber 5 to the intake passage. Note that, this boundary closing timing IX is shown in FIG. 9.

Figure 12:
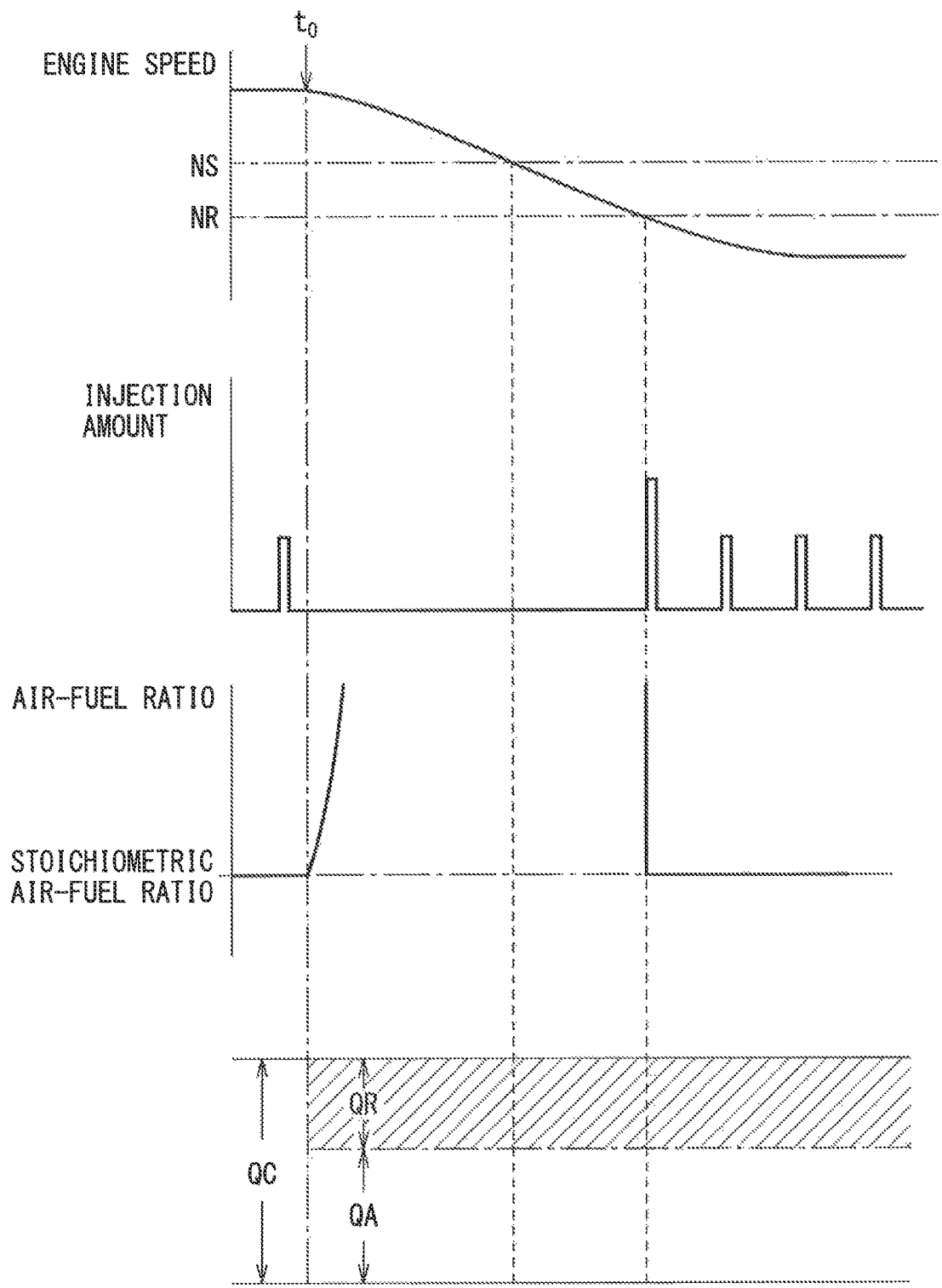
FIG. 12 is a view showing various amounts of gas QC, QA, and QR at the time of engine deceleration operation.

FIG. 12 shows the case where, when fuel injection from the fuel injector 13 is temporarily stopped at the time of engine deceleration operation and fuel injection is restarted after the fuel injection is stopped, in the period while the fuel injection is stopped and when the fuel injection is restarted, as shown in FIG. 11D and FIG. 11E, the closing timing IC of the intake valve 7 is at the retarded side from the boundary closing timing IX, that is, gas is blown back from the combustion chamber 5 to the intake passage. Note that, FIG. 12 shows the change of engine speed, the change of the fuel injection amount from the fuel injector 13, the change of the air-fuel ratio of the exhaust gas discharged from the combustion chamber 5, the amount of gas QC fed to the combustion chamber 5, the amount of gas QR blown back to the intake passage, and the amount of gas QA remaining in the combustion chamber 5 after the intake valve 7 closes, that is, the amount of fresh gas QA. Note that, in the engine speed of FIG. 12, NS indicates the fuel Injection stopping speed, NR indicates the fuel injection resume speed, and $t_0$ indicates when the engine deceleration operation is started.

As shown in FIG. 12, when the engine deceleration operation is started when the engine speed is higher than the fuel injection stopping speed NS, for example, 1500 rpm, the fuel injection is stopped when the engine deceleration operation is started and the fuel injection is restarted when the engine speed falls below the fuel injection resume speed NR, for example, 1000 rpm. If the fuel injection is stopped, gas in the combustion chamber 5 is gradually replaced by fresh gas, so the air-fuel ratio of the gas in the combustion chamber 5 gradually becomes lean. Therefore, as shown in FIG. 12, if fuel injection is stopped, the air-fuel ratio of the exhaust gas discharged from the combustion chamber 5 gradually becomes leaner. As a result, while the fuel injection is stopped, the gas blown back from the combustion chamber 5 to the intake passage becomes air. Therefore, the gas blown back from the combustion chamber 5 to the intake passage becomes air around when the fuel injection is restarted. Note that, in this case, at the time of the suction stroke, the blown back air QA is first fed into the combustion chamber 5, When the action of feeding blown back air QA into the combustion chamber 5 is completed, fresh gas QA is then fed into the combustion chamber 5.

Therefore, when fuel injection is restarted, the amount of air fed into the combustion chamber 5 becomes the sum of the amount of air QR blown back from the combustion chamber 5 to the intake passage and the amount of fresh gas QA. On the other hand, the amount of air detected by the intake air amount detector 17 at this time is the amount of fresh gas QA. Therefore, at this time, if the fuel injection amount from the fuel injector 13 is calculated based on the amount of air detected by the intake air amount detector 17 so that for example the air-fuel ratio becomes the stoichiometric air-fuel ratio, the state becomes one where no fuel at all is fed for the amount of air QR blown back from the combustion chamber 5 to the intake passage. Therefore, the air-fuel ratio of the air-fuel mixture in the combustion chamber 5 ends up becoming greatly lean. In this case, if the fuel injection amount from the fuel injector 13 is calculated based on the sum of the amount of fresh gas QA and the amount of air QR blown back from the combustion chamber 5 to the intake passage so that, for example, the air-fuel ratio becomes the stoichiometric air-fuel ratio, the air-fuel ratio of the air-fuel mixture in the combustion chamber 5 becomes the stoichiometric air-fuel ratio. Therefore, a good air-fuel mixture can be formed in the combustion chamber 5.

Here, the sum of the amount of fresh gas QA and the amount of air QR blown back from the combustion chamber 5 to the intake passage matches the amount of air QC fed to the combustion chamber 5. On the other hand, when there is an action of air being blown back from the combustion chamber 5 to the intake passage, the product of the volume of the combustion chamber 5 when the piston 4 is positioned at bottom dead center BDC and the pressure in the combustion chamber 5 at this time expresses the amount of air QC fed into the combustion chamber 5. At this time, the pressure in the combustion chamber 5 matches with the pressure in the intake passage downstream of the throttle valve 16. Therefore, the amount of air QC fed to the combustion chamber 5 can be calculated from the product of the volume of the combustion chamber 5 when the piston 4 is positioned at bottom dead center BDC and the pressure in the intake passage downstream of the throttle valve 16. In this case, the volume of the combustion chamber 5 when the piston 4 is positioned at bottom dead center BDC is known in advance, so the amount of air QC fed to the combustion chamber 5 can be calculated from the pressure in the intake passage downstream of the throttle valve 16. This pressure in the intake passage downstream of the throttle valve 16 is detected by the pressure sensor 18.

Now, in an embodiment according to the present invention, one cycle is comprised of a suction stroke, a compression stroke, an expansion stroke, and an exhaust stroke. If fuel injection is performed from the fuel injector 13 at the time of restart of fuel injection, at the next cycle, the gas blown back from the combustion chamber 5 to the intake passage becomes not air, but an air-fuel mixture. Therefore, it is possible to calculate the fuel injection amount based on the pressure in the intake passage downstream of the throttle valve 16 so as to make the air-fuel ratio of the air-fuel mixture in the combustion chamber 5 match the target air-fuel ratio only when calculating the fuel injection amount in the initial cycle when fuel injection is restarted.

Therefore, according to the present invention, there is provided a control system of an internal combustion engine comprising: at variable valve timing mechanism B able to set a closing timing IC of an intake valve 7 between suction bottom dead center and compression top dead center, a fuel injector 13 for feeding fuel to a combustion chamber 5, an intake air amount detector 17 for detecting an amount of intake air fed to an intake passage from an outside air, a throttle valve 16 arranged in the intake passage, a pressure sensor 18 for detecting a pressure in the intake passage downstream of the throttle valve 16, and an electronic control unit 30. One cycle is comprised of a suction stroke, a compression stroke, an expansion stroke, and an exhaust stroke, and an amount of intake air detected by the intake air amount detector 17 is used as a basis for calculation of a fuel injection amount to calculate a fuel injection amount from the fuel injector 13. The electronic control unit 30 is configured to temporarily stop an injection of fuel fed into the combustion chamber 5 from the fuel injector 13 at the time of an engine deceleration operation and restart the injection of fuel from the fuel injector 13 after the fuel injection is stopped at the time of the engine deceleration operation and, further, the electronic control unit 30 is configured to switch the basis for calculation of the fuel injection amount from the fuel injector 13 in an initial cycle when the injection of fuel from the fuel injector 13 is restarted, from the amount of intake air detected by the intake air amount detector 17 to the pressure in the intake passage detected by the pressure sensor 18 in case where an air in the combustion chamber 5 is blown back to the intake passage when the injection of fuel from the fuel injector 13 is restarted.

On the other hand, if the fuel injection amount from the fuel injector 13 in the initial cycle when fuel injection is restarted is calculated based on the pressure in the intake passage detected by the pressure sensor 18 in this way, in the second cycle when fuel injection is restarted, the air-fuel ratio of the air-fuel mixture blown back from the combustion chamber 5 to the intake passage becomes the target air-fuel ratio. Therefore, at this time, it becomes necessary to calculate the fuel injection amount for the fresh gas so that the air-fuel ratio of the fresh gas becomes the target air-fuel ratio. Therefore, in an embodiment according to the present invention, the electronic control unit 30 is configured to return the basis of calculation of the fuel injection amount from the fuel injector 13, from the pressure in the intake passage detected by the pressure sensor 18 to the amount of intake air detected by the intake air amount detector 17 in the second cycle when the injection of fuel from the fuel injector 13 is restarted after stopping of fuel injection at the time of engine deceleration operation.

Now, the fuel injection amount in the initial cycle when the injection of fuel from the fuel injector 13 is restarted has to be calculated based on the pressure in the intake passage detected by the pressure sensor 18 when the air in the combustion chamber 5 is blown back to the intake passage when the injection of fuel from the fuel injector 13 is restarted. In this case, as shown by the above-mentioned FIG. 11C, if retarding the closing timing IC of the intake valve 7 from suction bottom dead center, there is a boundary closing timing IX where the air in the combustion chamber 5 starts to be blown black to the intake passage. Therefore, in an embodiment according to the present invention, when the closing timing IC of the intake valve 7 when the injection of fuel from the fuel injector 13 is restarted is at the retarded side from the boundary closing timing IX, the electronic control unit 30 is configured to switch the basis for calculation of the fuel injection amount from the fuel injector 13 in the initial cycle when the injection of fuel from the fuel injector 13 is restarted, from the amount of intake air detected by the intake air amount detector 17 to the pressure in the intake passage detected by the pressure sensor 18.

On the other hand, when the closing timing IC of the intake valve 7 when the injection of fuel from the fuel injector 13 is restarted is at the advanced side from the boundary closing timing IX, as will be understood from FIGS. 11A, 11B, and 11C, the amount of air GC remaining in the combustion chamber 5 matches with the amount of fresh gas QA. Therefore, in an embodiment according to the present invention, when the closing timing IC of the intake valve 7 when the injection of fuel from the fuel injector 13 is restarted is at the advanced side from the boundary closing timing IX, the electronic control unit 30 is configured to calculate the fuel injection amount from the fuel injector 13 in the initial cycle when the injection of fuel from the fuel injector 13 is restarted based on the amount of intake air detected by the intake air amount detector 17.

Figure 13A:
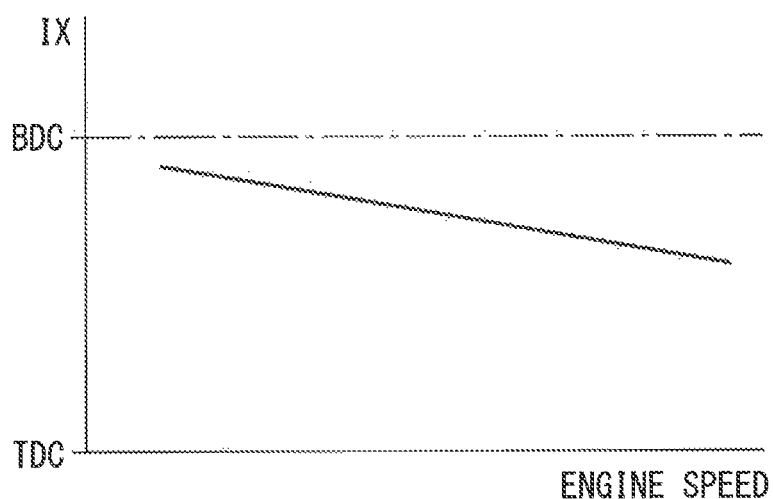
FIGS. 13A and 13B are views showing the boundary closing timing CX of the intake valve and correction coefficient F.

Note that, the higher the engine speed, the stronger the action of intake inertia pushing fresh gas into the combustion chamber 5. Therefore, as shown in FIG. 13A, the boundary closing timing IX of the intake valve 7 becomes more to the retarded side the higher the engine speed. Note that, in FIG. 13A, BDC shows suction bottom dead center, while TDC shows compression top dead center. The relationship between the boundary closing timing IX of the intake valve 7 and the engine speed shown in FIG. 13A is stored in advance in the ROM 32.

On the other hand, as explained above, in the initial cycle when the injection of fuel from the fuel injector 13 is restarted, the fuel injection amount is calculated based on the pressure in the intake passage detected by the pressure sensor 18. At this time, the amount of air QC fed to the combustion chamber 5 is calculated from the product of the volume of the combustion chamber 5 when the piston 4 is positioned at bottom dead center BDC and the pressure in the intake passage downstream of the throttle valve 16. On the other hand, the volume of the combustion chamber 5 when the piston 4 is positioned at bottom dead center BDC, as will be understood from a comparison of FIG. 8A and FIG. 8B, becomes larger the lower the mechanical compression ratio CR. Therefore, the amount of air QC fed to the combustion chamber 5 increases the lower the mechanical compression ratio CR. Therefore, the fuel injection amount required for making the air-fuel ratio the target air-fuel ratio increases the lower the mechanical compression ratio CR.

Figure 13B:
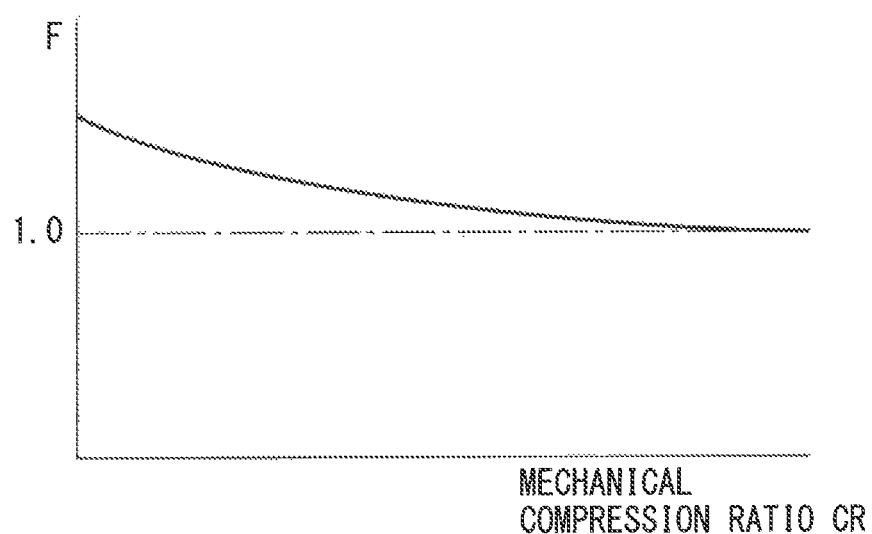

Therefore, fn an embodiment according to the present invention, when calculating the fuel injection amount from the fuel injector 13 based on the pressure in the intake passage detected by the pressure sensor 18 in the initial cycle when the injection of fuel from the fuel injector 13 is restarted, the electronic control unit 30 is configured to make the fuel injection amount from the fuel injector 13 increase the lower the mechanical compression ratio CR. Note that, in an embodiment according to the present invention, as the volume of the combustion chamber 5 when the piston 4 is positioned at bottom dead center BDC, the volume of the combustion chamber 5 at the time of engine low load operation where the mechanical compression ratio CR becomes the maximum is used, and by multiplying the fuel injection amount calculated in this case with the correction coefficient F shown in FIG. 13B, a fuel Injection amount corresponding to the mechanical compression ratio CR is calculated. In this case, as will be understood from FIG. 13B, the correction coefficient F becomes larger the lower the mechanical compression ratio CR. Note that, the relationship between the correction coefficient F and the mechanical compression ratio CR shown in FIG. 13B is stored in. advance in the ROM 32.

Next, referring to FIGS. 14A and 14B, the reason why calculating the fuel injection amount at the initial cycle when the injection of fuel from the fuel injector 13 is restarted based on only the amount of intake air detected by the intake air amount detector 17 is not preferable will be simply explained. FIG. 14A shows the case of multiplying the fuel injection amount calculated based on the amount of intake air QA detected by the intake air amount detector 17 with a correction coefficient KF (=QC/QA) found in advance by experiments to find the fuel injection amount from the fuel injector 13 at the time of restart of the fuel injection. As will be understood from FIG. 14A, if multiplying the fuel injection amount calculated based on the amount of intake air QA with the correction, coefficient KF (=QC/QA), the fuel injection amount obtained by multiplying the correction coefficient KF expresses the fuel injection amount with respect to the amount of air QC fed to the combustion chamber 5. Therefore, so long as the value of the correction coefficient KF (=QC/QA) does not change, the air-fuel ratio of the air-fuel mixture in the combustion chamber 5 is made the target air-fuel ratio.

However, if deposits build up at for example the valve part of the intake valve 7 or the valve seat for the intake valve formed on the cylinder head 3 along with the elapse of time, when the amount of lift of the intake valve 7 is large, that is, when air flows toward the combustion chamber 5, there is no major change in the amount of gas flowing between the intake valve 7 and the valve seat for the intake valve, but when the amount of lift, of the intake valve 7 becomes small, that is, when the air in the combustion chamber 5 is blown back to the intake passage, a large change occurs in the amount of gas flowing between the intake valve 7 and the valve seat for the intake valve. At this time, the amount of gas flowing between the intake valve 7 and the valve seat for the intake valve decreases considerably. Therefore, if deposits build up on the valve part of the intake valve 7 or the valve seat for the intake valve, as shown in FIG. 14B, the amount of air QR blown back to the inside of the intake passage decreases and as a result the amount of air QA remaining in the combustion chamber 5 increases.

In this way, if deposits build up on the valve part of the intake valve 7 or the valve seat for the intake valve, as shown in FIG. 14B, the amount of air QA remaining in the combustion chamber 5, that is, the amount of fresh gas QA, increases. Therefore, at this time, if multiplying the fuel injection amount calculated based on the amount of intake air QA detected by the intake air amount detector 17 with the correction coefficient KF found in advance by experiments to find the fuel injection amount at the time of restart of fuel injection, as shown in FIG. 14B, despite the fact that the amount of air QC fed to the combustion chamber 5 does not change, the fuel injection amount greatly increases. As a result, the air-fuel ratio of the air-fuel mixture in the combustion chamber 5 becomes considerably rich with respect to the target air-fuel ratio. Therefore, if considering the change along with time, there is a problem with calculating the fuel injection amount in the initial cycle when the injection of fuel from the fuel injector 13 is restarted based on only the amount of intake air detected by the intake air amount detector 17.

Next, referring to FIG. 15 to FIG. 17, the operational control routine for working the present invention will be explained. FIG. 15 shows the changes in the injection stopping flag and injection resume flag used in the operational control routine for working the present invention. Note that, FIG. 15 again shows the change in the engine speed and change in fuel injection amount the same as the change in engine speed and change in fuel injection amount from the fuel injector 13 shown in FIG. 12. Therefore, at FIG. 15, NS shows the fuel injection stopping speed, NR shows the fuel injection resume speed, and $t_0$ shows the time when the engine deceleration operation is started.

Now, referring to FIG. 15, if the engine speed is higher than, the fuel injection stopping speed NS when engine deceleration operation is started, if engine deceleration operation is started, as shown in FIG. 15, the injection stopping flag is set. If the injection stopping flag is set, as shown in FIG. 15, fuel injection is stopped. Next, if the engine speed falls below the fuel injection resume speed NR, the injection stopping flag is reset and the injection resume flag is set. If the injection resume flag is set, the fuel injection is restarted. This injection resume flag is reset if the fuel injection amount has finished being calculated for ail cylinders in the initial cycle when the injection of fuel from the fuel injector 13 is restarted.

Figure 16:
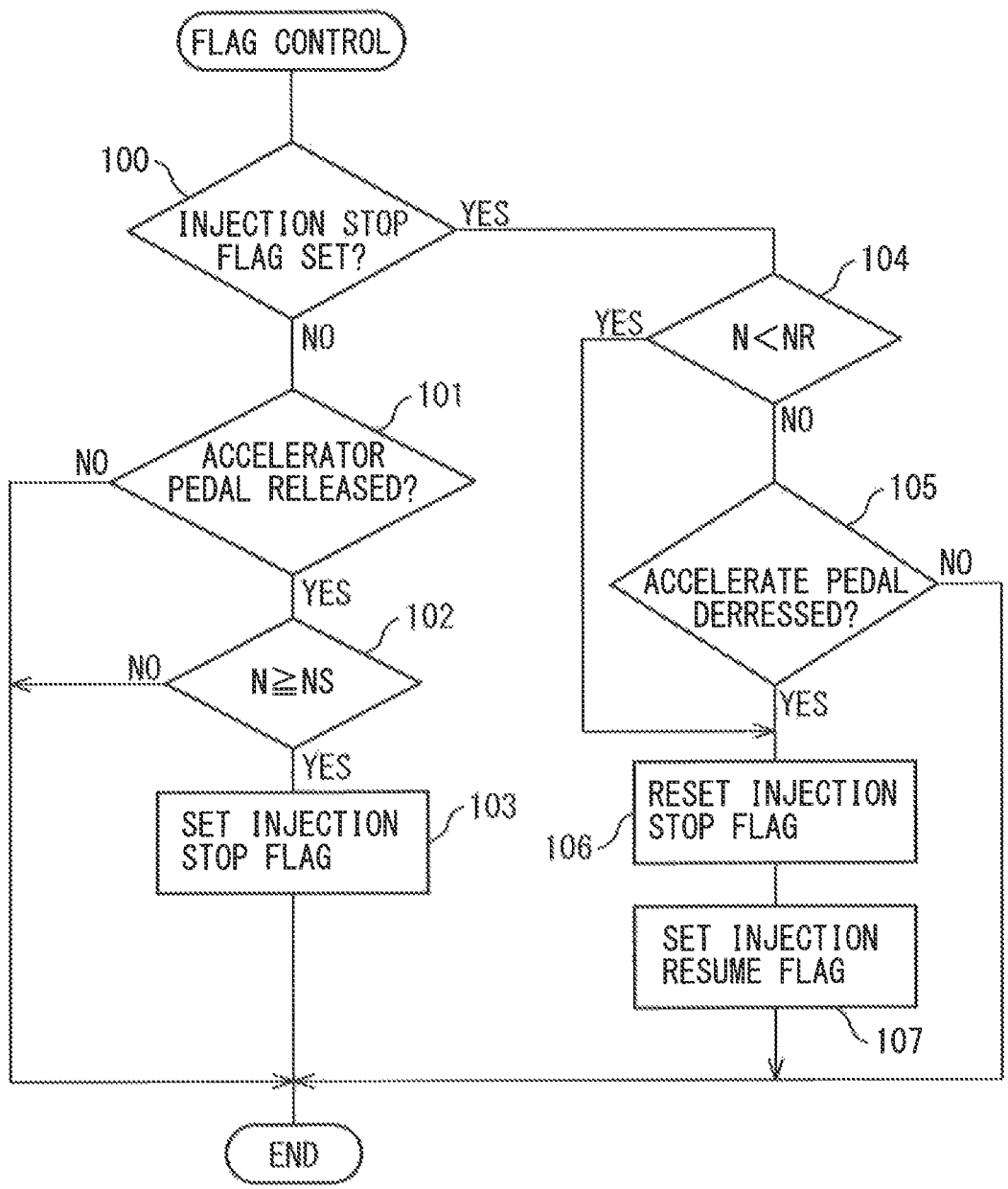
FIG. 16 is a flow chart for control of flags.

FIG. 16 shows the control routine of the injection stopping flag and injection resume flag shown in FIG. 15. This routine is executed by interruption at fixed time intervals. Referring to FIG. 16, first, at step 100, it is judged if the injection stopping flag is set. When the injection stopping flag is not set, the routine proceeds to step 101 where it is judged if the accelerator pedal 40 is released from the output signal of the load sensor 41, that is, if the deceleration operation of the engine is started. When it is judged that the accelerator pedal 40 is released from the output signal of the load sensor 41, that is, when it is judged that the deceleration operation of the engine is started, the routine proceeds to step 102.

At step 102, it is judged if the engine speed N is higher than the fuel injection stopping speed NS. When the engine speed N is lower than the fuel injection stopping speed NS, the processing cycle is ended. As opposed to this, when the engine speed is higher than the injection stopping speed NS, the routine proceeds to step 103 where the injection stopping flag is set. Next, the processing cycle is ended.

If the injection stopping flag is set, at the next processing cycle, the routine proceeds to step 104 where it is judged if the engine speed N falls below the fuel injection resume speed NR. When the engine speed N is higher than the fuel injection resume speed NR, the routine proceeds to step 106 where it is judged that the accelerator pedal 40 is depressed. When the accelerator pedal 40 is not depressed, the processing cycle is ended. As opposed to this, when at step 104 it is judged that the engine speed N falls below the fuel injection resume speed NR or when the engine speed is higher than the fuel injection resume speed NR, but at step 105 it is judged that the accelerator pedal 40 is depressed, the routine proceeds to step 106 where the injection stopping flag is reset, then at step 107, the injection resume flag is set.

Figure 17:
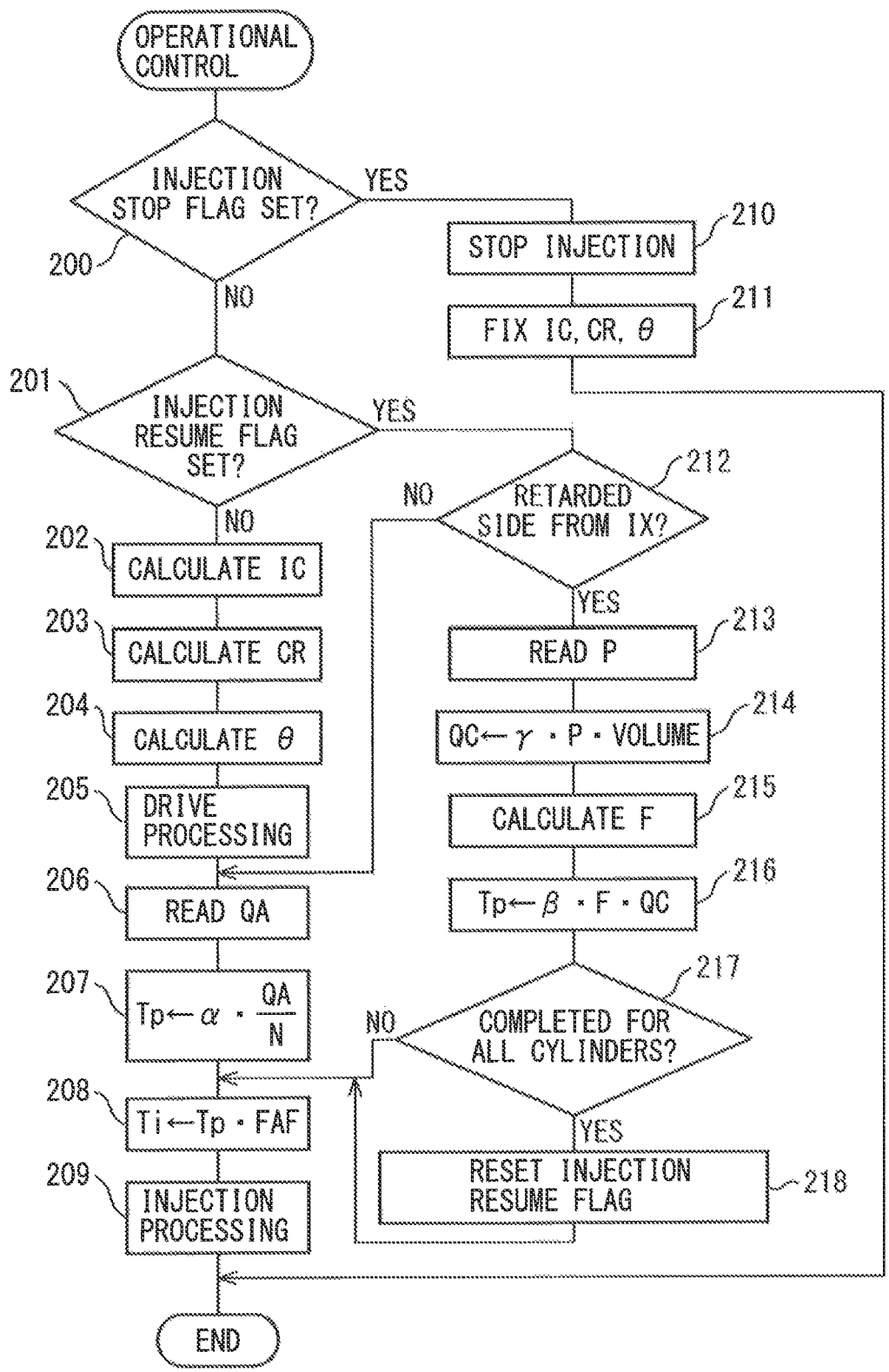
FIG. 17 is a flow chart for operational control.

FIG. 17 shows an operational control routine. This routine is also executed by interruption at fixed time intervals. Referring to FIG. 17, first, at step 200, it is judged if the injection stopping flag is set. When the injection stopping flag is not set, the routine proceeds to step 201 where it is judged if the injection resume flag is set. When the injection resume flag is not set, the routine proceeds to step 202. At step 202 to step 205, drive control of the closing timing IC of the intake valve 7, mechanical compression ratio CR, and throttle valve 16 is performed.

That is, at seep 202, the closing timing IC of the intake valve 7 is calculated from the map shown in FIG. 10A based on the engine load L and engine speed N. Next, at step 203, the mechanical compression ratio CR is calculated from the map shown in FIG. 10B based on the engine load L and engine speed N. Next, at step 204, the opening degree θ of the throttle valve 16 is calculated from the map shown in FIG. 10C based on the engine load L and engine speed N. Next, at step 205, the variable compression ratio mechanism A is driven so that the mechanical compression ratio becomes the mechanical compression ratio CR, the variable valve timing mechanism E is driven so that the closing timing of the intake valve 7 becomes the closing timing IC, and the actuator 16a is driven so that the opening degree of the throttle valve 16 becomes the opening degree θ.

Next, from step 206 to step 209, the fuel injection amount from the fuel injector 13, in actuality the fuel injection time from the fuel injector 13, is calculated and the fuel injection processing from the fuel injector 13 is performed. That is, at step 206, the amount of intake air QA detected by the intake air amount detector 17 is read in. Next, at step 207, this amount of intake air QA is divided by the engine speed N and the calculated value QA/N is multiplied with the constant a whereby the basic fuel injection time Tp from each fuel injector 13 required for making the air-fuel ratio the stoichiometric air-fuel ratio is calculated. Next, at step 208, this basic fuel injection time Tp is multiplied with the feedback correction coefficient FAF to calculate the final fuel injection time Ti. This feedback correction coefficient FAF is made to change centered about 1.0 so that the air-fuel ratio of each cylinder becomes the target air-fuel ratio based on the output signal of the air-fuel ratio sensor 21. Next, at step 209, fuel is injected from each fuel injector 13 by the final fuel injection time Ti.

On the other hand, when at step 200 it is judged that the injection stopping flag is set, the routine proceeds to step 210 where the fuel injection from, each fuel, injector 13 is stopped. Next, at step 211, the closing timing of the intake valve 7, mechanical compression ratio, and opening degree of the throttle valve 16 are respectively fixed to the closing timing IC, mechanical compression ratio CR, and opening degree θ when fuel injection from the fuel injector 13 is stopped. However, in this case, it is possible to perform, for example, control so as to make the throttle valve 16 temporarily close without fixing the opening degree of the throttle valve 16.

On the other hand, when at step 201 it is judged that the injection resume flag is set, the routine proceeds to step 212 where fuel injection control in the initial cycle when the injection of fuel from the fuel injector 13 is restarted is performed. That is, at step 212, it is judged if the closing timing IC of the intake valve 7 is at the retarded side from the boundary closing timing IX shown in FIG. 13A. When it is judged that the closing timing IC of the intake valve 7 is at the advanced side from the boundary closing timing IX, the routine proceeds to step 206 where the fuel injection from the fuel injector 13 is controlled based on the amount of intake air QA detected by the intake air amount detector 17. As opposed to this, when at step 212 it is judged that the closing time IC of the intake valve 7 is at the retarded side from the boundary closing timing IX, the routine proceeds to step 213 where the fuel injection time from the fuel injector 13 is calculated based on the pressure in the intake passage downstream of the throttle valve 16, that is, based on the pressure detected by the pressure sensor 18.

That is, at step 213, the pressure P detected by the pressure sensor 18 is read in. Next, at step 214, the volume of the combustion chamber 5 at the time of engine low load operation where the mechanical compression ratio CR becomes maximum is multiplied with this pressure P and constant γ to thereby calculate the amount of air QC fed to the combustion chamber 5. Next, at step 215, the correction coefficient F with respect to the fuel injection amount from the fuel injector 13 is calculated from the relationship shown in FIG. 13B based on the current mechanical compression ratio CR. Next, at step 216, the amount of air QC fed to the combustion chamber 5 is multiplied with the correction coefficient F and constant β to calculate the basic fuel injection time Tp from each fuel injector 13 required for making the air-fuel ratio the stoichiometric air-fuel ratio.

Next, at step 217, it is judged that the basic fuel injection time Tp has been completed for the fuel injector 13 for all cylinders. When the calculation of the basic fuel injection time Tp has not been completed for the fuel injector 13 for all cylinders, the routine proceeds to step 208 where the basic fuel injection time Tp calculated at step 216 is multiplied with the feedback correction coefficient FAF to calculate the final fuel injection time Ti. Next, at step 209, fuel is injected by the final fuel injection time Ti from the corresponding fuel injector 13. On the other hand, when it is judged at step 217 that the basic fuel injection time Tp has been completed for the fuel injector 13 for all cylinders, the routine proceeds to step 218 where the injection resume flag is reset then the routine proceeds to step 208.

In this way, when the basic fuel injection time Tp based on the pressure detected by the pressure sensor 18 finishes being calculated for the fuel injector 13 for all cylinders in the initial cycle when the fuel injection is restarted, the injection resume flag is reset. If the injection resume flag is reset, at the next processing cycle, the routine proceeds from step 201 to step 202 where the fuel injection from the fuel injector 13 is controlled based on the amount of intake air QA detected by the intake air amount detector 17. Therefore, in the second cycle when the fuel injection is restarted, the fuel injection from the fuel injector 13 is controlled based on the amount of intake air QA detected by the intake air amount detector 17.

On the other hand, when the injection stopping flag is not set and the injection resume flag is also not set, as will be understood from FIG. 17, the fuel injection from the fuel injector 13 is controlled based on the amount of intake air QA detected by the intake air amount detector 17. That is, in an embodiment according to the present invention, the fuel injection from the fuel injector 13 is controlled based on the pressure detected by the pressure sensor 18 only in the initial cycle when the fuel injection is restarted.

Figure 18:
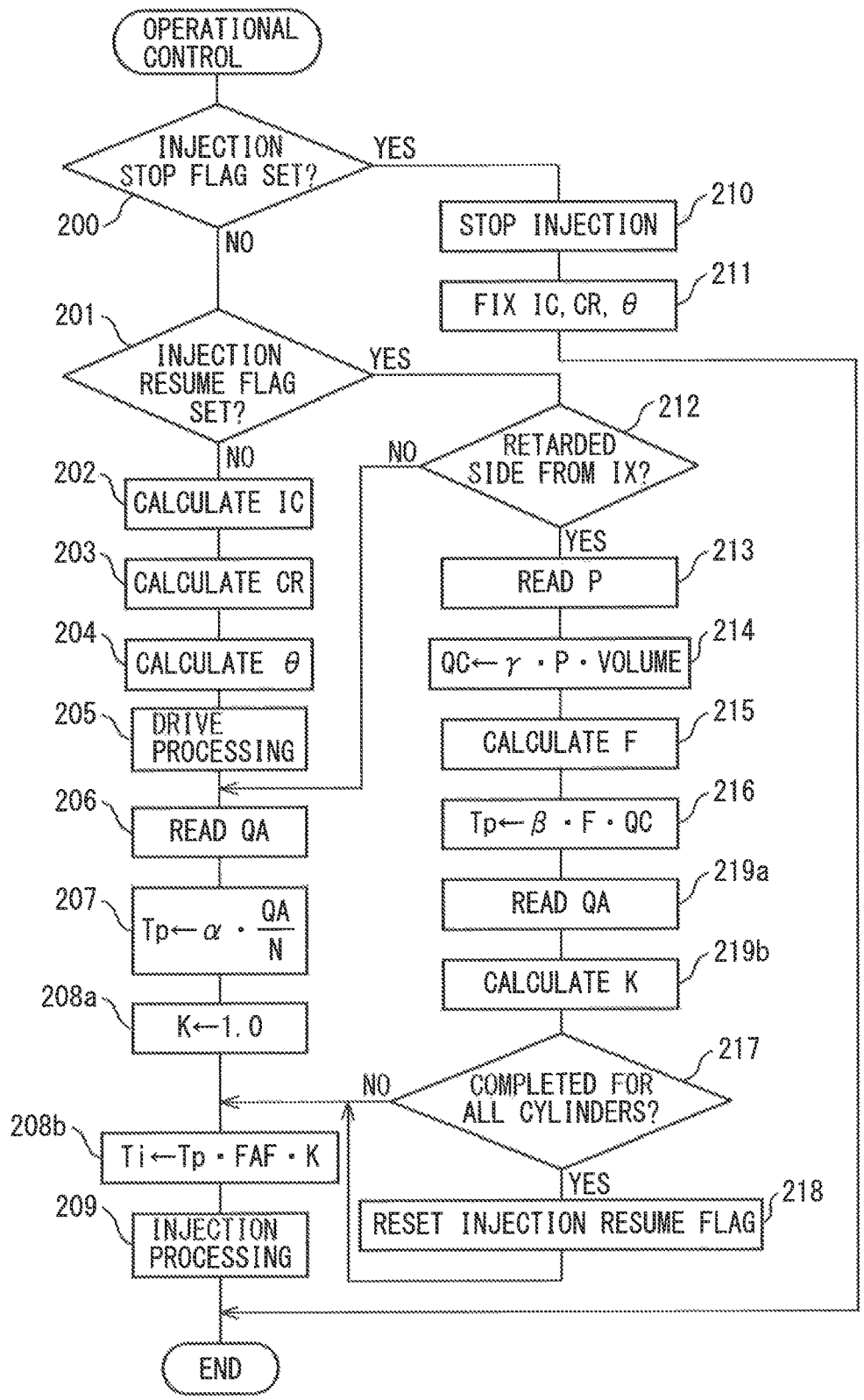
FIG. 18 is a flow chart showing a modification of operational control.

On the other hand, it is also possible to configure the system so as to constantly control the fuel injection from the fuel injector 13 based on the amount of intake air QA detected by the intake air amount detector 17 when injection of fuel from the fuel injector 13 is being performed and correct the fuel injection amount from the fuel injector 13 based on the pressure detected by the pressure sensor 18 just in the initial cycle when fuel injection is restarted. FIG. 18 shows a modification of the operational control routine in the case configured in this way. Note that, in the operational control routine shown in FIG. 18, the only differences from the operational control routine shown in FIG. 17 are that step 203 at FIG. 17 is changed to step 208b at FIG. 18, the new step 208a is added before step 208b, and step 219a and step 219b are added at FIG. 18 between step 216 and step 217 at FIG. 17.

Therefore, next, the part different from FIG. 17 will be explained with reference to FIG. 18. Referring to FIG. 18, at step 208b, a new correction coefficient K is introduced. At step 208b, the basic fuel injection time Tp is multiplied with the feedback correction coefficient FAF and this correction coefficient K to calculate the final fuel injection time Ti. This correction coefficient K is made 1.0 at step 208a. Therefore, when the injection stopping flag is not set and the injection resume flag is also not set, that is, when the routine proceeds from step 206 to step 209, the operational control routine shown in FIG. 18 is substantially the same as the operational control routine shown in FIG. 17.

On the other hand, in the operational control routine shown in FIG. 18, unlike the operational control routine shown in FIG. 17, at step 219a, the amount of intake air QA detected by the intake air amount detector 17 is read, then at step 219b, the correction coefficient K is calculated. This correction coefficient K calculated at step 219b is the value $(\beta \cdot F \cdot QC \cdot N)/(\alpha \cdot QA)$ which is obtained by dividing the basic fuel injection time Tp ($=\beta \cdot F \cdot QC$) shown in step 216 by the basic fuel injection time Tp($=\alpha \cdot QA/N$) shown in step 207. The value of this correction coefficient K corresponds to QC/QA in FIG. 12. That is, in the operational control routine shown in FIG. 18, when calculating the fuel injection time Ti in the initial cycle when fuel injection is restarted, the fuel injection time calculated based on the amount of intake air QA detected by the intake air amount detector 17 is corrected by the correction coefficient K considering also the pressure detected by the pressure sensor 18.

Therefore, in the operational control routine shown in FIG. 18, the electronic control unit 30 is configured to switch the basis for calculation of the fuel injection amount from the fuel injector 13 in the initial cycle when the injection of fuel from the fuel injector 13 is restarted, from the amount of intake air detected by the intake air amount detector 17 to the amount of intake air detected by the intake air amount detector 17 and the pressure in the intake passage detected by the pressure sensor 18 when air in the combustion chamber 5 is blown back to the intake passage when injection of fuel from the fuel injector 13 is restarted.

REFERENCE SIGNS LIST 5 combustion chamber
7 intake valve
16 throttle valve
17 intake air amount detector
18 pressure sensor
A variable compression ratio mechanism
B variable valve timing mechanism

The invention claimed is:

1. A control system of an internal combustion engine comprising:
a variable valve timing mechanism able to set a closing timing of an intake valve between suction bottom dead center and compression top dead center,
a fuel injector for feeding fuel to a combustion chamber,
an intake air amount detector for detecting an amount of intake air fed to an intake passage from an outside air,
a throttle valve arranged in the intake passage,
a pressure sensor for detecting a pressure in the intake passage downstream of the throttle valve, and
an electronic control unit, wherein one cycle is comprised of a suction stroke, a compression stroke, an expansion stroke, and an exhaust stroke, and an amount of intake air detected by the intake air amount detector is used as a basis for calculation of a fuel injection amount to calculate a fuel injection amount from the fuel injector,
said electronic control unit being configured to temporarily stop an injection of fuel fed into the combustion chamber from the fuel injector at the time of an engine deceleration operation and restart the injection of fuel from the fuel injector after the fuel injection is stopped at the time of the engine deceleration operation and, further, said electronic control unit being configured to switch the basis for calculation of the fuel injection amount from the fuel injector in an initial cycle when the injection of fuel from the fuel injector is restarted, from the amount of intake air detected by the intake air amount detector to the pressure in the intake passage detected by the pressure sensor in case where an air in the combustion chamber is blown back to the intake passage when the injection of fuel from the fuel injector is restarted.

2. The control system of an internal combustion engine according to claim 1, wherein said electronic control unit is configured to return the basis for calculation of the fuel injection amount from the fuel injector, from the pressure in the intake passage detected by the pressure sensor to the amount of intake air detected by the intake air amount detector in a second cycle when the injection of fuel from the fuel injector is restarted after stopping of fuel injection at the time of engine deceleration operation.

3. The control system of an internal combustion engine according to claim 1, wherein the control system further comprises a variable compression ratio mechanism able to control a mechanical compression ratio, and said electronic control unit is configured to make the fuel injection amount from the fuel injector increase the lower the mechanical compression ratio when calculating the fuel injection amount from the fuel injector based on the pressure in the intake passage detected by the pressure sensor in the initial cycle when the injection of fuel from the fuel injector is restarted.

4. The control system of an internal combustion engine according to claim 1, wherein there is a boundary closing timing where an air in the combustion chamber starts to be blown back to the intake passage if retarding the closing timing of the intake valve from suction bottom dead center, and, said electronic control unit is configured to switch the basis for calculation of the fuel injection amount from the fuel injector in the initial cycle when the injection of fuel from the fuel injector is restarted, from the amount of intake air detected toy the intake air amount detector to the pressure in the intake passage detected by the pressure sensor when the closing timing of the intake valve when the injection of fuel from the fuel injector is restarted is at a retarded side from the boundary closing timing.

5. The control system of an internal combustion engine according to claim 4, wherein said electronic control unit is configured to calculate the fuel injection amount from the fuel injector in the initial cycle when the injection of fuel from the fuel injector is restarted based on the amount of intake air detected by the intake air amount detector when the closing timing of the intake valve when the injection of fuel from the fuel injector is restarted is at an advanced side from the boundary closing timing.

6. The control system of an internal combustion engine according to claim 1, wherein the control system further comprises an air-fuel ratio sensor detecting an air-fuel ratio in an engine exhaust passage and said electronic control unit is configured to control the fuel injection amount from the fuel injector by the air-fuel ratio sensor so that, the air-fuel ratio in the exhaust passage becomes a predetermined target air-fuel ratio.

7. The control system of an internal combustion engine according to claim 1, wherein said electronic control unit is configured to switch the basis for calculation of the fuel injection amount from the fuel injector in the initial cycle when the injection of fuel from the fuel injector is restarted, from the amount of intake air detected by the intake air amount detector to the amount of intake air detected by the intake air amount detector and the pressure in the intake passage detected by the pressure sensor in case where an air in the combustion chamber is blown back to the intake passage when the injection of fuel from the fuel injector is restarted.

* * * * *